(No Model.)

W. A. COCHRAN.
SPOON.

No. 303,212. Patented Aug. 5, 1884.

Attest:
F. M. Burnham
Jno. C. McGill, Jr.

Wm. A. Cochran
Inventor:
By J. H. Macdonald
and
S. W. Tallmadge
Attys.

UNITED STATES PATENT OFFICE.

WILLIAM A. COCHRAN, INDIANAPOLIS, INDIANA.

SPOON.

SPECIFICATION forming part of Letters Patent No. 303,212, dated August 5, 1884.

Application filed May 10, 1882. (No model.)

*To all whom it may concern:*

Be it known that I, WILLIAM A. COCHRAN, a citizen of the United States, residing at Indianapolis, in the county of Marion and State of Indiana, have invented certain new and useful Improvements in Hollow-Handled Spoons, of which the following is a specification, reference being had therein to the accompanying drawings.

My invention relates to hollow handles for spoons; and it consists in details of construction and arrangement of parts that will be hereinafter more fully set forth in the specification and claims and pointed out in the accompanying drawings, in which—

Figure 1:
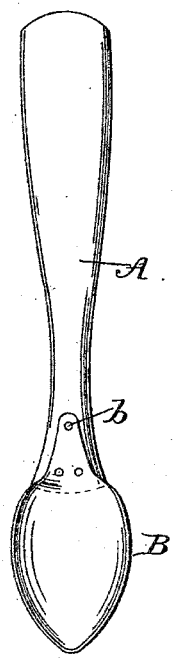
Figure 2:
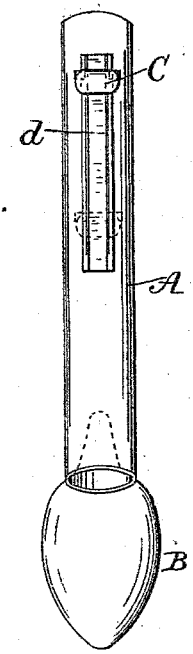
Figure 3:
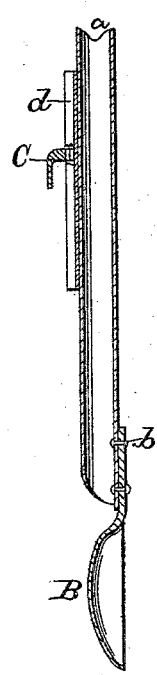
Figure 4:
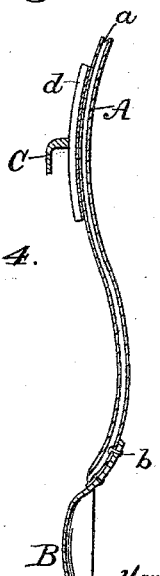

Figure 1 is a front view, Fig. 2 a back view, and Figs. 3 and 4 sections, of my improved spoon.

The object of the device is to provide a spoon by means of which liquid can be drank directly from cups, glasses, soup-plates, &c. To obtain this I make the handle of the spoon hollow.

Referring more particularly to the drawings, A represents an ordinary spoon-handle, hollowed out or grooved on the inside, as shown at *a*. On the back of the spoon-handle, is a catch or holding-piece, C, which is intended to rest on the edge of the cup or glass when the spoon is not in use. This catch is adapted to slide in guides *d*, so that it can be adjusted to different heights of vessels; or it may be soldered to the back of the spoon at the height of an ordinary coffee or tea cup or glass, such as used for juleps, milk-punches, &c. The bowl of the spoon can be used in tl ordinary manner when it is not desired to u the hollow. By this form of construction tl necessity of carrying the bowl of the spoon the mouth is obviated. This is particular advantageous to invalids. The handle may ] curved so that the upper curved part will re on the edge of the cup or other vessel. Tl handle may also be made in telescopic for1 so as be adjustable, as above described; and may have a hollow rib on the back or fron by means of which the liquid is conveyed the mouth.

Having thus described my invention, what claim as new, and desire to secure by Lette Patent, is—

1. The combination, with the handle A, the guideway *d*, secured to and forming a pa of said handle, and catch C, adapted to slic and be retained in position upon the sa) guideway, and form a means for holding tl handle in position, substantially as describe( 2. The combination, with the ordina1 spoon-bowl, B, of the hollow handle A, rivete to said spoon and sliding rest C, whereby tl spoon may be used in the ordinary mann( or as a suction-tube, and be supported in pla( upon the edge of the vessel, substantially ; described.

In testimony whereof I affix my signature i presence of two witnesses.

WILLIAM A. COCHRAN.

Witnesses:
 HUGO M. HUG,
 R. F. TARKINGTON.